tates Patent Office 3,530,164
Patented Sept. 22, 1970

3,530,164
FLAME RETARDANT AGENTS FOR
THERMOPLASTIC PRODUCTS
Helen Currier Gillham, Princeton, N.J., and Allan Ellis
Sherr, Norwalk, and Harvey Gerald Klein, Stamford,
Conn., assignors to American Cyanamid Company,
Stamford, Conn., a corporation of Maine
No Drawing. Continuation-in-part of application Ser. No.
296,364, July 19, 1963. This application Aug. 13, 1965,
Ser. No. 479,599
Int. Cl. C09k 3/28
U.S. Cl. 260—45.8   12 Claims

ABSTRACT OF THE DISCLOSURE

This invention relates to flame-retardant compositions comprising thermoplastic polymers containing a flame-retarding amount of a monophosphonium halide having the formula (I) 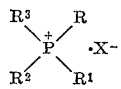

wherein R, $R^1$, $R^2$ and $R^3$ are, individually, alkyl ($C_1$–$C_8$), alkenyl ($C_2$–$C_8$), cyano, hydroxy, imidazolyl, and carboxy substituted alkyl ($C_1$–$C_8$), aryl ($C_6$–$C_{10}$), aralkyl ($C_7$–$C_{11}$), vinyl, halo, polyhalo, and nitro ar-substituted aralkyl ($C_7$–$C_{11}$), dialkylaminoalkyl ($C_3$–$C_6$), carboalkoxyalkyl ($C_3$–$C_6$), carboxyalkenyl ($C_3$–$C_4$) or carboalkoxyalkenyl ($C_4$–$C_8$) radicals, and X is a bromine, chlorine or iodine radical.

---

This application is a continuation-in-part of our copending application, Ser. No. 296,364, filed July 19, 1963 and now abandoned.

The use of various materials incorporated into thermoplastic resins in order to improve the flame-retardance thereof has been known in the prior art. Many compounds are commercially available for such a use, among them being chlorostyrene copolymers, chlorinated paraffin wax with triphenyl stibine, chlorinated paraffins and aliphatic antimonyl compounds, as well as antimony oxide-chlorinated hydrocarbon mixtures. A drawback, however, of these compounds has been the fact that generally a large amount, i.e. upwards of 35%, of additive must be incorporated into the resin in order to make it sufficiently flame-retardant. Also these prior art additives tend to crystallize or oil out of the resin after a relatively short time of incorporation.

We have now found a group of compounds which may be added to thermoplastic resins in relatively small amounts and still result in the production of satisfactory flame-retardant compositions while not crystallizing or oiling out of the resin after incorporation therein.

The production of thermoplastic resin compositions which are flame-retardant, i.e. have high resistance to heat, is of considerable commercial importance. For example, such articles as castings, moldings, foamed or laminated structures and the like are required, or at least desired, to be resistant to fire and flame and to possess the ability to endure heat without deterioration. Typical illustrations of such applications can be found in castings for live electrical contacts which should not be ignited or deteriorated by heat and sparks. Structural members such as pipes, wall coverings, wall paneling, windows, items such as ash trays, waste baskets and the like are further examples of plastic products wherein flame-retardance is desirable.

It is therefore an object of the present invention to provide novel flame-retardant thermoplastic resin compositions.

It is a further object of the present invention to provide flame-retardant compositions comprising thermoplastic polymers and a flame-retarding amount of a monophosphonium halide, such as those represented by Formula I, above.

It is a further object of the present invention to provide novel compounds which impart flame-retardance to polymeric materials and are represented by Formula II, above.

These and further objects will become more apparent to those skilled in the art upon reading the more detailed description set forth hereinbelow.

THE THERMOPLASTIC POLYMERS

Additionally, however, thermoset type materials may be employed such as the polyester resins, polyurethanes, and the like. Examples of the vinyl type polymers which may be used to form our novel compositions are the vinyl halides, the vinylidene halides, the vinyl acetates, polyvinylbutyral, butadiene copolymers, acrylonitrile-butadiene-styrene polymers, the acrylonitriles, etc. Additionally and preferably, one may incorporate the flame-retardant agents mentioned above into such polymers as the styrene polymers, i.e. polystyrene, etc., the α-olefin polymers, such as the homopolymers and copolymers etc. containing, as the major constituent, ethylene, propylene, and the like and the acrylate and methacrylate polymers produced from monomers having the formula (II) 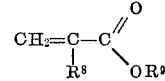

wherein $R^8$ is hydrogen or a methyl radical and $R^9$ is hydrogen or an alkyl radical having from 1 to 6 carbon atoms, inclusive. Examples of monomers represented by Formula II include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and their corresponding alkyl methacrylates.

Also such polymers as the nylons, e.g. adipic acid-hexamethylenediamine reaction products, the polyformaldehydes, cellulose acetate (and/or butyrate, etc.), the polycarbonates, i.e. phosgene-bisphenol A reaction products, the so-called impact polymers, i.e. rubber-polymer blends such as blends of polystyrene with 5–10% of butadiene-styrene, etc. may be made flame-retardant by the incorporation therein of the phosphonium halides more specifically discussed hereinbelow.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly the allyl, methallyl, vinyl, methvinyl, butenyl, etc., unsaturated esters of aliphatic and aromatic monobasic acids such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc. and ethylene.

Other examples of monomers that can be used as polymers to form the resin portion of our novel flame-retardant compositions are the vinyl halides, more particularly, vinyl fluoride, vinyl chloride, vinyl bromide and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized to useful polymers, useful in the production of our novel flame-retardant compositions, are allyl alcohol, methallyl alcohol, diallyl carbonate, allyl lactate, allyl alphahydroxyisobutyrate, allyl trichlorosilane, diallyl phthalate, diallyl methylgluconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, allyl diglycol carbonate, etc. Other examples of allyl compounds that may be employed are given, for example, in U.S. Pat. No. 2,510,503, issued June 6, 1950.

These above mentioned monomers may be polymerized, copolymerized, etc., in any known manner such as by free-radical generating catalysts, irradiation, anion and cation type catalysts and the like, said method of polymerization forming no part of the present invention.

THE MONOPHOSPHONIUM HALIDES

A preferred group of phosphonium halides, however, are those represented by Formula I. The monophosphonium halides may be incorporated into the resins in flame-retarding amounts, i.e. generally amounts ranging from about 1%, by weight, to about 35%, by weight, preferably 5% to 25%, by weight, based on the weight of the polymer, have been found sufficient. A further group of preferred monophosphonium halide compounds useful in producing our novel compositions are those wherein three of R, $R^1$, $R^2$ and $^3$ are cyanoethyl or phenyl radicals.

That is to say, the flame-retardant monophosphonium halide additive may be added to the resin by milling the resin and the halide on, for example, a two-roll mill, in a Banbury mixer, etc., or the halide may be added by molding the halide and resin simultaneously, extruding the halide and resin or by merely blending the resin in powder form with the halide and thereafter forming the final desired article. Additionally, the monophosphonium halide may also be added during the resin manufacture, i.e., during the monomer polymerization procedure, provided the catalyst, etc. conditions and ingredients of the polymerization system are inert to the monophosphonium halide.

The monophosphonium halides set forth hereinabove may be produced in any known manner without varying from the scope of the present invention. Various methods for the production of phosphonium halides of this type are disclosed in, for example, articles by Rauhut et al., J. Org. Chem., volume 28, page 473, 1963; Grayson et al., J. Am. Chem. Soc., volume 81, page 4806, 1959; Grayson et al., J. Am. Chem. Soc., volume 82, page 3922, 1960; U.S. Pat. 3,005,013 to Grayson et al., patented Oct. 17, 1961; Rauhut et al., patent application, Ser. No. 211,412, filed July 20, 1962 and these articles and patents are hereby incorporated herein by reference.

Those phosphonium halides represented by Formula I may be produced by reacting a compound of the formula

with a compound having the formula $R^3Y$ wherein R, $R^1$, $R^2$, $R^3$, and X are as defined above in regard to Formula I under the following conditions: heat, to a temperature ranging from about 0° C. to about 150° C., a solution of the halide and tertiary phosphine in an appropriate solvent, such as butanol, acetonitrile and the like, for from 1 to 24 hours. The phosphonium halide is isolated by filtration, in the case of an insoluble product, by precipitation with ethyl ether or by evaporation of the solvent. Yields usually are from 50% to 100% of the theoretical, said procedures, however, forming no part of the present invention.

In any of said procedures wherein an unsaturated radical is present in the phosphine or the halide, a polymerization inhibitor such as hydroquinone is preferably added to retard the polymerization of the compound produced.

The imidazolyl compounds may alternatively be prepared by reacting, under the conditions specified above in regard to the other monophosphonium halides, a compound such as tributylvinylphosphonium bromide or tricyclohexylvinylphosphonium bromide, etc., with an appropriately substituted imidazole, e.g., 2-methyl imidazole by refluxing in a suitable solvent. The products are then recovered by filtration.

The carboxyalkyl compounds may also be produced via another mechanism according to the equation:

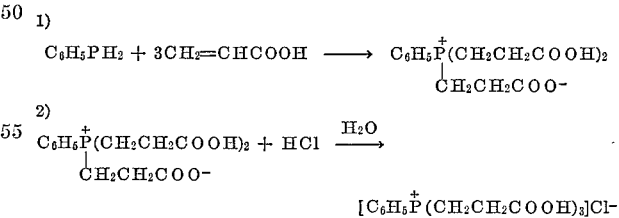

The first step is accomplished at 80 to 105° C. under a nitrogen atmosphere for about 3 hours while the second step is conducted at room temperature and recovery is by subsequent water evaporation.

Examples of compounds which are useful in producing the novel compositions of the present invention, include tetramethylphosphonium chloride, bromide and iodide,
tetraethylphosphonium chloride, bromide and iodide,
tetra-n-propylphosphonium chloride, bromide and iodide,
tetraisopropylphosphonium chloride, bromide and iodide,
tetra-n-butylphosphonium chloride, bromide and iodide,
tetra-t-butylphosphonium chloride, bromide and iodide,
tetraisobutylphosphonium chloride, bromide and iodide,
tetrapentyphosphonium chloride, bromide and iodide,
tetrahexylphosphonium chloride, bromide and iodide, tetraheptylphosphonium chloride, bromide and iodide,
tetraoctylphosphoninum chloride, bromide and iodide,
tetravinylphosphonium chloride, bromide and iodide,
tetraallylphosphonium chloride, bromide and iodide,
tetrapropenyl-1-phosphonium chloride, bromide and iodide,
tetra-1-butenylphosphonium chloride, bromide and iodide,
tetra-2-butenylphosphonium chloride, bromide and iodide,
tetra-1-or-2-pentenylphosphonium chloride, bromide and iodide,
tetra-1-;-2-or-3-hexenylphosphonium chloride, bromide and iodide,
tetra-1-;-2-or-3-heptenylphosphonium chloride, bromide and iodide,
tetra-1-;-2-;-3-or-4-ocetnylphosphonium chloride, bromide and iodide,
tetracyanomethylphosphonium chloride, bromide and iodide,
tetra-2-cyanoethylphosphonium chloride, bromide and iodide,
tetra-2-cyanopropylphosphonium chloride, bromide and iodide,
tetra-3-cyanopentylphosphonium chloride, bromide and iodide,
tetra-2-cyanohexylphosphonium chloride, bromide and iodide,
tetra-4-cyanohexylphosphonium chloride, bromide and iodide,
tetra-3-cyanheptylphosphonium chloride, bromide and iodide,
tetra-6-cyanooctylphosphonium chloride, bromide and iodide,
tetrahydroxymethyphosphonium chloride, bromide and iodide,
tetra-2-hydroxyethylphosphonium chloride, bromide and iodide,
tetra-2-hydroxypropylphosphonium chloride, bromide and iodide,
tetra-3-hydroxypentylphosphonium chloride, bromide and iodide,
tetra-4-hydroxyhexylphosphonium chloride, bromide and iodide,
tetra-6-hydroxyhexylphosphonium chloride, bromide and iodide,
tetra-3-hydroxyheptylphosphonium chloride, bromide and iodide,
tetra-8-hyroxyoxtylphosphonium chloride, bromide and iodide,
tetracarboxylmethylphosphonium chloride, bromide and iodide,
tetra-2-carboxyethylphosphonium chloride, bromide and iodide,
tetra-2-carboxypropylphosphonium chloride, bromide and iodide,
tetra-3-carboxypentylphosphonium chloride, bromide and iodide,
tetra-5-carboxyhexylphosphonium chloride, bromide and iodide,
tetra-7-carboxyheptylphosphonium chloride, bromide and iodide,
tetra-1-carboxyoctylphosphonium chloride, bromide and iodide,
tetraimidazolylmethylphosphonium chloride, bromide and iodide,
tetra-2-imidazolylethylphosphonium chloride, bromide and iodide,
tetra-3-imidazolylpropylphosphonium chloride, bromide and iodide,
tetra-5-imidazolylpentylphosphonium chloride, bromide and iodide,
tetra-2-imidazolylbutyphosphonium chloride, bromide and iodide,
tetra-3-cyanobutylphosphonium chloride, bromide and iodide,
tetra-3-hydroxybutylphosphonium chloride, bromide and iodide,
tetra-4-carboxybutylphosphonium chloride, bromide and iodide,
tetra-2-imidazolylhexylphosphonium chloride, bromide and iodide,
tetra-3-imidazolylheptylphosphonium chloride, bromide and iodide,
tetra-8-imidazolyloctylphosphonium chloride, bromide and iodide,
tetraphenylphosphonium chloride, bromide and iodide,
tetratolylphosphonium chloride, bromide and iodide,
tetraxylylphosphonium chloride, bromide and iodide,
tetra-$\alpha$-methylphenylphosphonium chloride, bromide and iodide,
tetranaphthylphosphonium chloride, bromide and iodide,
tetrabenylphosphonium chloride, bromide and iodide,
tetra-2-phenethylphosphonium chloride, bromide and iodide,
tetra-$\alpha$-methylbenzylphosphonium chloride, bromide and iodide,
tetra-$\alpha$-ethylbenzylphosphonium chloride, bromide and iodide,
tetra-4-phenylbutylphosphonium chloride, bromide and iodide,
tetra-5-phenylpentylphosphonium chloride, bromide and iodide,
tetra(o, m or p-vinylbenzyl)phosphonium chloride, bromide and iodide,
tetra(o, m or p-chloro, bromo, fluoro or iodobenzyl)phosphonium chloride, bromide and iodide,
tetra(o, m or p-dichloro, dibromo, difluoro or diiodobenzyl)phosphonium chloride, bromide, and iodide,
tetra(o, m or p-nitrobenzyl)phosphonium chloride, bromide and iodide,
tetra(o, m or p-vinyl-2-phenethyl)phosphonium chloride, bromide and iodide,
tetra(o, m or p-chloro-2-phenethyl)phosphonium chloride, bromide and iodide,
tetra(o, m or p-dibromo-2-phenethyl)phosphonium chloride, bromide and iodide,
tetra(o, m or p-nitro-2-phenethyl)phosphonium chloride, bromide and diode,
tetra(o, m or p-vinyl-$\alpha$-methylbenzyl)phosphonium chloride, bromide and iodide,
tetra(o, m or p-fluoro-$\alpha$-methylbenzyl)phosphonium chloride, bromide and iodide,
tetra(o, m or p-trichloro-$\alpha$-methylbenzyl)phosphonium chloride, bromide and iodide,
tetra(o, m or p-nitro-$\alpha$-methylbenzyl)phosphonium chloride, bromide and iodide,
tetranaphthylmethylphosphonium chloride, bromide and iodide,
tetra(vinyl, chloro, dibromo or nitro ar-substituted naphthylmethyl)phosphonium chloride, bromide and iodide,
tetra(dimethylaminomethyl)phosphonium chloride, bromide and iodide,
tetra(diethylaminomethyl)phosphonium chloride, bromide and iodide,
tetra(diethylaminoethyl)phosphonium chloride, bromide and iodide,
tetra(butylmethylaminomethyl)phosphonium chloride, bromide and iodide,
tetrakis(carbomethoxymethyl)phosphonium chloride, bromide, and iodide,
tetrakis(carboethoxymethyl)phosphonium chloride, bromide and iodide,
tetrakis(carbomethoxyethyl)phosphonium chloride, bromide and iodide,
tetrakis(2-carboethoxyethyl)phosphonium chloride, bromide and iodide, tetrakis(3-carboethoxypropyl)phosphonium chloride, bromide and iodide,
tetrakis(2-carbopropoxyethyl)phosphonium chloride, bromide and iodide,
tetrakis(carbobutoxymethyl)phosphonium chloride, bromide and iodide,
tetrakis(3-carbopropoxypropyl)phosphonium chloride, bromide and iodide,
tetrakis(carbopentoxymethyl)phosphonium chloride, bromide and iodide,
tetrakis(4-carboethoxybutyl)phosphonium chloride, bromide and iodide,
tetrakis(carbomethoxyvinyl)phosphonium chloride, bromide and iodide,
tetrakis(2-carbomethoxyallyl)phosphonium chloride, bromide and iodide,
tetrakis(carboethoxyvinyl)phosphonium chloride, bromide and iodide,
tetrakis(carbobutoxyvinyl)phosphonium chloride, bromide and iodide,
tetrakis(2-carbomethoxy-2-butenyl)phosphonium chloride, bromide and iodide,
tetrakis(2-carbomethoxy-3-pentenyl)phosphonium chloride, bromide and iodide,
methyltriphenylphosphonium chloride, bromide and iodide,
ethyltriphenylphosphonium chloride, bromide and iodide,
propyltriphenylphosphonium chloride, bromide and iodide,
benzyltriphenylphosphonuim chloride, bromide and iodide,
p-nitrobenzyltriphenylphosphonium chloride, bromide and iodide,
2,4-dichlorobenzyltriphenylphosphonium chloride, bromide and iodide,
carboethoxymethyltriphenylphosphonium chloride, bromide and iodide,
tris(2-cyanoethyl)methylphosphonium chloride, bromide and iodide,
tris(2-cyanoethyl)-ethylphosphonium chloride, bromide and iodide,
tris(2-cyanoethyl)octylphosphonium chloride, bromide and iodide,
tris(2-cyanoethyl)allylphosphonium chloride, bromide and iodide,
benzyltris(2-cyanoethyl)phosphonium chloride, bromide and iodide,
2,4-dichlorobenzyltris(2-cyanoethyl)phosphonium chloride, bromide and iodide,
2,5-dichlorobenzyltris(2-cyanoethyl)phosphonium chloride, bromide and iodide,
3,4-dichlorobenzyltris(2-cyanoethyl)phosphonium chloride, bromide and iodide,
2,4-diiodobenzyltriphenylphosphonium chloride, bromide and iodide,
2,5-difluorobenzyltriphenylphosphonium chloride, bromide and iodide,
3,4-dibromobenzyltriphenylphosphonium chloride, bromide and iodide,
2-hydroxyethyltriphenylphosphonium chloride, bromide and iodide,
tris(2-cyanoethyl)-2-hydroxyethylphosphonium chloride, bromide and iodide,
tributylbenzylphosphonium chloride, bromide and iodide,
tributylvinylphosphonium chloride, bromide and iodide,
bis(2-hydroxypropyl)diphenylphosphonium chloride, bromide and iodide,
2-hydroxypropylmethyldiphenylphosphonium chloride, bromide and iodide,
tributyl-2,4-dichlorobenzylphosphonium chloride, bromide and iodide,
2,5-dichlorobenzylphosphonium chloride, bromide and iodide,
3,4-dichlorobenzylphosphonium chloride, bromide and iodide,
tris(2-cyanoethyl)-o-vinylbenzylphosphonium chloride, bromide and iodide,
tris(2-cyanoethyl)-p-vinylbenzylphosphonium chloride, bromide and iodide,
tris(2-cyanoethyl)-m-vinylbenzylphosphonium chloride, bromide and iodide,
triphenyl-o, m and p-vinylbenzylphosphonium chloride, bromide and iodide,
tris(2-carboxyethyl)phenylphosphonium chloride, bromide and iodide,
bis(2-carboxyethyl)bis(2-cyanoethyl)phosphonium chloride, bromide and iodide,
tributyl-(o, m or p-vinylbenzyl)phosphonium chloride, bromide and iodide,
ethyltriphenylphosphonium chloride, bromide and iodide,
2-hydroxyethyltriphenylphosphonium chloride, bromide and iodide,
tributyl[2-(2-methyl-1-imidazolyl)ethyl]phosphonium chloride, bromide and iodide,
tricyclohexyl[2-(2-methyl-1-imidazolyl)ethyl]phosphonium chloride, bromide and iodide,
tributyl(diethylaminoethyl)phosphonium chloride, bromide and iodide,
2-butenylbis(2-cyanoethyl)phenylphosphonium chloride, bromide and iodide,
4-octenyl(2-hydroxyethyl)methylphenylphosphonium chloride, bromide and iodide,
2-cyanoethyl(4-cyanobutyl)diphenylphosphonium chloride, bromide and iodide,
diethylphenyl(4-hydroxybutyl)phosphonium chloride, bromide and iodide,
allylbenzyl(8-hydroxyoctyl)methylphosphonium chloride, bromide and iodide,
carboethoxyethyl(8-cyanooctyl)diphenylphosphonium chloride, bromide and iodide,
bis(8-carboxyoctyl)dimethylphosphonium chloride, bromide and iodide,
bis(2-cyanoethyl)(p-bromobenzyl)phenylphosphonium chloride, bromide and iodide,
bis(2-cyanoethyl)(4-carboxybutyl)phenylphosphonium chloride, bromide and iodide,
bis(2-cyanoethyl)naphthylphenylphosphonium chloride, bromide and iodide,
diphenylmethyl[4-(2-methyl-1-imidazolyl)butyl]phosphonium chloride, bromide and iodide,
tris(2-cyanoethyl)(2-methylnaphthyl)phosphonium chloride, bromide and iodide,
tris(2-cyanoethyl)2,4-(dibromobenzyl)phosphonium chloride, bromide and iodide,
methyldiphenyl[8-(2-methyl-1-imidazolyl)octyl]phosphonium chloride, bromide and iodide,
diphenylmethyl(p-iodobenzyl)phosphonium chloride, bromide and iodide,
tris(2-cyanoethyl)(3-chloro-2-methyl-naphthyl)phosphonium chloride, bromide and iodide,
tributyldimethylaminoethylphosphonium chloride, bromide and iodide,
2-carboethoxypropyltriphenylphosphonium chloride, bromide and iodide,
carbooctoxymethyltriphenylphosphonium chloride, bromide and iodide,
dibutylaminoethyltrimethylphosphonium chloride, bromide and iodide,
dibenzyl(p-chlorobenzyl)propylphosphonium chloride, bromide and iodide,
cyanomethyltrimethylphosphonium chloride, bromide and iodide,
butyltris(p-nitrobenzyl)phosphonium chloride, bromide and iodide,
tetra-3-carboxypropenyl-1-phosphonium chloride, bromide and iodide,
tetra-2-carboxyvinyl propenyl-1-phosphonium chloride, bromide and iodide,
trimethyl-3-carboxypropenyl-1-phosphonium chloride, bromide and iodide, triphenyl-2-carboxyvinyl-1-phosphonium chloride, bromide and iodide,
tris(2-cyanoethyl)-2-carbomethoxyvinylphosphonium chloride and bromide,
tris(2-cyanoethyl)-2-carbomethoxypropenyl-3-phosphonium chloride and bromide,
triphenyl-4-carbomethoxybutenyl-4-phosphonium chloride and bromide,
triphenyl-2-carbomethoxypropenyl-3-phosphonium chloride and bromide,
tributy-2-carbomethoxypropenyl-3-phosphonium chloride and bromide,
tributyl-5-carbomethoxypentenyl-2-phosphonium chloride and bromide,
tributyl-2-carbomethoxyhexenyl-1-phosphonium chloride and bromide,
tris(2-cyanoethyl)-2-carboethoxyvinyl phosphonium chloride and bromide,
tris(2-cyanoethyl)-3-carbobutoxypropenyl-3-phosphonium chloride and bromide,
dioctylvinyl-2-carbomethoxypropenyl-3-phosphonium chloride and bromide,
tris(2-hydroxyethyl)-2-carbomethoxypropenyl-3-phosphonium chloride and bromide,
bis(1-carboxypropyl)methyl-2-carbomethoxypropenyl-3-phosphonium chloride and bromide,
methylnaphthylphenyl-2-carbomethoxypropenyl-3-phosphonium chloride and bromide,
dibenzylethyl-2-carbomethoxypropenyl-3-phosphonium chloride and bromide,
p-nitrobenzyltris(2-carbomethoxy propenyl-3) phosphonium chloride and bromide,
tris (dimethylaminoethyl)-2-carbomethoxypropenyl-3-phosphonium chloride and bromide,
tris(2-carbomethoxyethyl)-2-carbomethoxypropenyl-3-phosphonium chloride and bromide,
tris(2-cyanoethyl)-3-carboxypropenyl-1-phosphonium chloride and bromide,
tributyl-2-carboxyvinyl phosphonium chloride and bromide, mixtures thereof, other compounds having mixed substituents and the like.

The following examples are set forth for purposes of illustration only and are not to be construed as limitations on the present invention except as set forth in the appended claims. All parts and percentages are by weight unless otherwise specified.

Any appropriate flame-retardance test may be used to determine the flame retardance properties of any specific compound. One test which is reasonably efficient is that designated as a modified version of ASTM test D-635-56T. The specifications for this test are: a specimen, 5″ in length, 0.5″ in width and 0.045″ in thickness, is marked at the 1″ and 4″ lengths and is then supported with its longitudinal axis horizontal and its transverse axis inclined at 45° to the horizontal. A Bunsen burner with a 1″ blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4″ mark, the specimen is designated as "self-extinguishing" or "flame-retardant."

EXAMPLE 1

85 parts of polyethylene and 15 parts of triphenylmethylphosphonium bromide are milled together on a two roll mill at about 170° C. The resulting milled composition is molded into strips 5″ in length, 0.5″ wide and 0.45″ in thickness and said strips are then subjected to the above specified flame-retardance test. The strips pass the test and are therefore designated as flame-retardant.

Following the procedure of Example 1, the following examples were carried out utilizing different flame-retardant agents and various thermoplastic resin polymers. The results of these examples are set forth in Table I below. In each instance, the resultant plastic-monophosphonium halide mixture passed the flame-retardance test and was designated as flame and fire-retardant. In the table PE=polyethylene; PP=polypropylene; PMMA= poly(methylmethacrylate); PA=poly(acrylic acid); PS= poly(styrene); PF=polyformaldehyde; CA=cellulose acetate; PC=polycarbonate (Bisphenol A—phosgene reaction product); AN=acrylonitrile; ST=styrene and BD=butadiene. The term "nylon" refers to the reaction product of adipic acid and hexamethylene diamine.

TABLE I

| Ex. | Polymer | R | R¹ | R² | R³ | X | Percent |
|---|---|---|---|---|---|---|---|
| 2 | PP |  |  |  | CH₃ | Br | 15 |
| 3 | PP | Same as above | Same as above | Same as above | CH₃ | I | 10 |
| 4 | PP | do | do | do | CH₃CH₂ | Br | 15 |
| 5 | PP | do | do | do | CH₃(CH₂)₂ | Br | 20 |
| 6 | PE | do | do | do | CH₂=CHCH₂ | Br | 30 |
| 7 | PP | do | do | do | 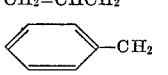—CH₂ | Cl | 20 |
| 8 | PE | do | do | do | Same as above | Br | 25 |
| 9 | PE | do | do | do | do | I | 15 |
| 10 | PP | do | do | do | do | I | 15 |
| 11 | PE | do | do | do | O₂N—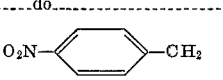—CH₂ | Br | 20 |
| 12 | PP | do | do | do | Cl—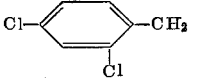—CH₂ (Cl) | Cl | 15 |
| 13 | PE | do | do | do | Same as above | Cl | 15 |
| 14 | PE | do | do | do | CH₃CH₂OCCH₂ | Br | 20 |
| 15 | PE | NCCH₂CH₂ | NCCH₂CH₂ | NCCH₂CH₂ | CH₃ | I | 10 |
| 16 | PMMA | NCCH₂CH₂ | NCCH₂CH₂ | NCCH₂CH₂ | CH₃ | I | 10 |
| 17 | PE | NCCH₂CH₂ | NCCH₂CH₂ | NCCH₂CH₂ | CH₃CH₂ | Br | 20 |
| 18 | PE | NCCH₂CH₂ | NCCH₂CH₂ | NCCH₂CH₂ | CH₃(CH₂)₇ | Br | 30 |
| 19 | PE | NCCH₂CH₂ | NCCH₂CH₂ | NCCH₂CH₂ | CH₂=CHCH₂ | Br | 20 |
| 20 | PMMA | NCCH₂CH₂ | NCCH₂CH₂ | NCCH₂CH₂ | CH₂=CHCH₂ | Br | 20 |
| 21 | PE | NCCH₂CH₂ | NCCH₂CH₂ | NCCH₂CH₂ | CH₂=CHCH₂ | Cl | 30 |

TABLE I—Continued

| | | Flame Retardant | | | | | |
|---|---|---|---|---|---|---|---|
| Ex. | Polymer | R | R¹ | R² | R³ | X | Percent |
| 22 | PE | NCCH$_2$CH$_2$ | NCCH$_2$CH$_2$ | NCCH$_2$CH$_2$ | C$_6$H$_5$—CH$_2$ | Cl | 25 |
| 23 | PE | NCCH$_2$CH$_2$ | NCCH$_2$CH$_2$ | NCCH$_2$CH$_2$ | Same as above | Br | 30 |
| 24 | PE | NCCH$_2$CH$_2$ | NCCH$_2$CH$_2$ | NCCH$_2$CH$_2$ | Cl—C$_6$H$_3$(Cl)—CH$_2$ | I | 15 |
| 25 | PP | NCCH$_2$CH$_2$ | NCCH$_2$CH$_2$ | NCCH$_2$CH$_2$ | Cl—C$_6$H$_3$(Cl)—CH$_2$ | I | 15 |
| 26 | PE | NCCH$_2$CH$_2$ | NCCH$_2$CH$_2$ | NCCH$_2$CH$_2$ | Mixed isomers of— Cl—C$_6$H$_3$(Cl)—CH$_2$ (2,4=37%; 2,5=50%; 3,4=13%) | Cl | 10 |
| 27 | PE | C$_6$H$_5$ | C$_6$H$_5$ | C$_6$H$_5$ | HOCH$_2$CH$_2$ | Br | 15 |
| 28 | PE | C$_6$H$_5$—CH$_2$ | C$_6$H$_5$—CH$_2$ | C$_6$H$_5$—CH$_2$ | C$_6$H$_5$—CH$_2$ | Cl | 20 |
| 29 | PE | CH$_3$CH$_2$CH$_2$CH$_2$ | CH$_3$CH$_2$CH$_2$CH$_2$ | CH$_3$CH$_2$CH$_2$CH$_2$ | Same as above | Cl | 30 |
| 30 | PMMA | CH$_3$CH$_2$CH$_2$CH$_2$ | CH$_3$CH$_2$CH$_2$CH$_2$ | CH$_3$CH$_2$CH$_2$CH$_2$ | do | Cl | 30 |
| 31 | PE | CH$_3$CH$_2$CH$_2$CH$_2$ | CH$_3$CH$_2$CH$_2$CH$_2$ | CH$_3$CH$_2$CH$_2$CH$_2$ | CH$_2$=CH | Br | 30 |
| 32 | PMMA | CH$_3$CH$_2$CH$_2$CH$_2$ | CH$_3$CH$_2$CH$_2$CH$_2$ | CH$_3$CH$_2$CH$_2$CH$_2$ | CH$_2$=CH | Br | 30 |
| 33 | PE | CH$_3$CHCH$_2$ OH | CH$_3$CHCH$_2$ OH | C$_6$H$_5$ | C$_6$H$_5$ | Br | 20 |
| 34 | PE | CH$_3$CHCH$_2$ OH | CH$_3$ | Same as above | Same as above | I | 20 |
| 35 | PE | NCCH$_2$CH$_2$ | NCCH$_2$CH$_2$ | NCCH$_2$CH$_2$ | HOCH$_2$CH$_2$ | Br | 20 |
| 36 | PE | CH$_3$CH$_2$CH$_2$CH$_2$ | CH$_3$CH$_2$CH$_2$CH$_2$ | CH$_3$CH$_2$CH$_2$CH$_2$ | Cl—C$_6$H$_3$(Cl)—CH$_2$ | Cl | 15 |
| 37 | PE | CH$_3$CH$_2$CH$_2$CH$_2$ | CH$_3$CH$_2$CH$_2$CH$_2$ | CH$_3$CH$_2$CH$_2$CH$_2$ | CH$_3$CH$_2$CH$_2$CH$_2$ | Br | 30 |
| 38 | PE | NCCH$_2$CH$_2$ | NCCH$_2$CH$_2$ | NCCH$_2$CH$_2$ | CH$_2$=CH—C$_6$H$_4$—CH$_2$ | Cl | 20 |
| 39 | PP | NCCH$_2$CH$_2$ | NCCH$_2$CH$_2$ | NCCH$_2$CH$_2$ | Same as above | Cl | 20 |
| 40 | PE | C$_6$H$_5$ | C$_6$H$_5$ | C$_6$H$_5$ | do | Cl | 20 |
| 41 | PE | NCCH$_2$CH$_2$ | NCCH$_2$CH$_2$ | NCCH$_2$CH$_2$ | H$_3$CO$_2$CCCH$_2$ ‖ CH$_2$ | Cl | 25 |
| 42 | PE | HOOCCH$_2$CH$_2$ | HOOCCH$_2$CH$_2$ | HOOCCH$_2$CH$_2$ | C$_6$H$_5$ | Cl | 20 |
| 43 | PP | HOOCCH$_2$CH$_2$ | HOOCCH$_2$CH$_2$ | HOOCCH$_2$CH$_2$ | Same as above | Cl | 20 |
| 44 | PE | NCCH$_2$CH$_2$ | NCCH$_2$CH$_2$ | HOOCCH$_2$CH$_2$ | HOOCCH$_2$CH$_2$ | Cl | 30 |
| 45 | PE | C$_6$H$_5$ | C$_6$H$_5$ | C$_6$H$_5$ | H$_3$COOCCCH$_2$ ‖ CH$_2$ | Cl | 25 |
| 46 | PE | CH$_3$CH$_2$CH$_2$CH$_2$ | CH$_3$CH$_2$CH$_2$CH$_2$ | CH$_3$CH$_2$CH$_2$CH$_2$ | H$_3$COOCCCH$_3$ ‖ CH$_2$ | Cl | 30 |
| 47 | PP | CH$_3$CH$_2$CH$_2$CH$_2$ | CH$_3$CH$_2$CH$_2$CH$_2$ | CH$_3$CH$_2$CH$_2$CH$_2$ | H$_3$COOCCCH$_3$ ‖ CH$_2$ | Cl | 30 |
| 48 | PE | CH$_3$CH$_2$CH$_2$CH$_2$ | CH$_3$CH$_2$CH$_2$CH$_2$ | CH$_3$CH$_2$CH$_2$CH$_2$ | CH$_2$=CH—C$_6$H$_4$—CH$_2$ | Cl | 30 |
| 49 | PE | C$_6$H$_5$ | C$_6$H$_5$ | C$_6$H$_5$ | CH$_3$CH$_2$ | I | 15 |

TABLE I—Continued

| Ex. | Polymer | R | R¹ | R² | R³ | X | Percent |
|---|---|---|---|---|---|---|---|
| 50 | PE | Same as above | Same as above | Same as above | $HOCH_2CH_2$ | Cl | 25 |
| 51 | PE | $CH_3CH_2CH_2CH_2$ | $CH_3CH_2CH_2CH_2$ | $CH_3CH_2CH_2CH_2$ | [2-methyl-4,5-dihydroimidazol-1-yl-ethyl: CH=CH, N—CH₂CH₂, N=C, CH₃] | Br | 10 |
| 52 | PMMA | $CH_3CH_2CH_2CH_2$ | $CH_3CH_2CH_2CH_2$ | $CH_3CH_2CH_2CH_2$ | Same as above | Br | 10 |
| 53 | PE | [phenyl] | [phenyl] | [phenyl] | ...do... | Br | 20 |
| 54 | PE | $CH_3CH_2CH_2CH_2$ | $CH_3CH_2CH_2CH_2$ | $CH_3H_2CH_2CH_2$ | $(CH_3CH_2)_2NCH_2CH_2$ | Br | 10 |
| 55 | PP | $NCCH_2CH_2$ | $NCCH_2CH_2$ | [phenyl] | $CH_3CH=CHCH_2$ | Br | 25 |
| 56 | PMMA | [phenyl] | $CH_3$ | $HOCH_2CH_2$ | $CH_3CH_2CH=CH(CH_2)_4$ | I | 25 |
| 57 | (¹) | $NCCH_2CH_2$ | $NC(CH_2)_4$ | [phenyl] | [phenyl] | Br | 20 |
| 58 | PP | $HOCH_2CH_2CH_2CH_2$ | [phenyl] | $C_2H_5$ | $C_2H_5$ | I | 15 |
| 59 | PMMA | $HOCH_2(CH_2)_7$ | [phenyl]—$CH_2$ | $CH_3$ | $CH_2=CHCH_2$ | Br | 30 |
| 60 | PE | [phenyl] | $NCCH_2(CH_2)_7$ | [phenyl] | $CH_3CH_2OOCCH_2$ | I | 25 |
| 61 | PA | $HOOC(CH_2)_7CH_2$ | $HOOC(CH_2)_7CH_2$ | $CH_3$ | $CH_3$ | I | 30 |
| 62 | (²) | $NCCH_2CH_2$ | $NCCH_2CH_2$ | [phenyl] | Br—[phenyl]—$CH_2$ | Cl | 25 |
| 63 | PMMA | $NCCH_2CH_2$ | $NCCH_2CH_2$ | Same as above | $HOOCCH_2CH_2CH_2$ | Br | 15 |
| 64 | PE | $NCCH_2CH_2$ | [naphthyl] | ...do... | $NCCH_2CH_2$ | Br | 20 |
| 65 | PE | [2-methyl-4,5-dihydroimidazol-1-yl-butyl: CH=CH, N(CH₂)₄, N=C, CH₃] | [phenyl] | ...do... | $CH_3$ | I | 20 |
| 66 | PE | [naphthyl]—$CH_2$ | $NCCH_2CH_2$ | $NCCH_2CH_2$ | $NCCH_2CH_2$ | Br | 25 |
| 67 | PE | Br—[phenyl(Br)]—$CH_2$ | $NCCH_2CH_2$ | $NCCH_2CH_2$ | $NCCH_2CH_2$ | Cl | 30 |
| 68 | PMMA | [phenyl] | [phenyl] | [2-methyl-4,5-dihydroimidazol-1-yl-octyl: CH=CH, N(CH₂)₈, N=C, CH₃] | $CH_3$ | I | 25 |
| 69 | PMMA | Same as above | Same as above | I—[phenyl]—$CH_2$ | $CH_3$ | Cl | 20 |
| 70 | PE | [naphthyl(Cl)]—$CH_2$ | $NCCH_2CH_2$ | $NCCH_2CH_2$ | $NCCH_2CH_2$ | I | 25 |
| 71 | PP | $CH_3CH_2CH_2CH_2$ | $CH_3CH_2CH_2CH_2$ | $CH_3CH_2CH_2CH_2$ | $(CH_3)_2NCH_2CH_2$ | Br | 30 |
| 72 | PMMA | [phenyl] | [phenyl] | [phenyl] | $CH_3CH_2OOCC_2H_4$ | Br | 20 |
| 73 | PMMA | Same as above | Same as above | Same as above | $CH_3OOCC_8H_{16}$ | I | 20 |
| 74 | PE | $(C_4H_9)_2NCH_2CH_2$ | $CH_3$ | $CH_3$ | $CH_3$ | I | 25 |

TABLE I—Continued

| Ex. | Polymer | R | R¹ | R² | R³ | X | Percent |
|---|---|---|---|---|---|---|---|
| 75 | PE | $C_3H_7$ | ⌬—$CH_2$ | ⌬—$CH_2$ | $Cl$—⌬—$CH_2$ | Br | 30 |
| 76 | PE | $NCCH_2CH_2$ | $NCCH_2CH_2$ | $NCCH_2CH_2$ | $NCCH_2CH_2$ | Br | 20 |
| 77 | PMMA | $CH_3$ | $CH_3$ | $CH_3$ | $NCCH_2$ | I | 25 |
| 78 | PP | $C_8H_{17}$ | $C_8H_{17}$ | $C_8H_{17}$ | $C_8H_{17}$ | Br | 20 |
| 79 | PE | $O_2N$—⌬—$CH_2$ | $O_2N$—⌬—$CH_2$ | $O_2N$—⌬—$CH_2$ | $O_2N$—⌬—$CH_2$ | Br | 30 |
| 80 | PE | Same as above | Same as above | Same as above | $C_4H_9$ | Br | 25 |
| 81 | PS | $CH_3$ | $CH_3$ | $NO_2$—⌬—$CH_2$ | $CH_3$ | Cl | 15 |
| 82 | PMMA | $CH_3CH_2OOCC_2H_4$ | $C_2H_5$ | $C_2H_5$ | naphthyl | Br | 20 |
| 83 | (³) | ⌬ | $(CH_3)_2NCH_2$ | $C_2H_5$ | Same as above | Cl | 25 |
| 84 | CA | $HOOCCH_2CH_2CH$ | $Br$—⌬—$CH_2$ | $HOOCCH_2CH_2CH$ | do | Cl | 30 |
| 85 | PS | $C_8H_{17}$ | $C_8H_{17}$ | $C_8H_{17}$ | $CH_3CH_2OOCCH_2$ | Br | 10 |
| 86 | PC | $CH_2=CH$ | $NCCH_2CH_2$ | $NCCH_2CH_2$ | $NCCH_2CH_2$ | Cl | 20 |
| 87 | PF | ⌬—$CH_2$ | $HOOC$—$CH=CH$ | $NCCH_2CH_2$ | $HOOCCH_2CH_2CH$ | I | 30 |
| 88 | PE | $CH_3$ | $CH_3$ | naphthyl-$CH_2$/Cl | $(C_4H_9)_2NCH_2CH_2$ | Br | 30 |
| 89 | PS | $C_4H_9$ | $CH_3CH=CHCH_2$ | $C_4H_9$ | $C_4H_9$ | Br | 10 |
| 90 | (⁴) | $HOOC$—$CH_2CH=CH$ | ⌬ | ⌬ | ⌬ | Cl | 30 |
| 91 | CA | $CH_3(CH_2)_5CH=CH$ | Same as above | $H_9C_4O_2CCCH_2$ / $CH_2$ | $CH_2=CH$—⌬—$CH_2$ | Br | 30 |
| 92 | PS | $C_4H_9$ | naphthyl-$CH_2$ | $C_4H_9$ | $C_4H_9$ | Br | 15 |
| 93 | PMMA | ⌬ | ⌬ | $CNCH_2CH_2$ | ⌬ | Cl | 20 |
| 94 | PF | ⌬ | ⌬ | ⌬ | $H_3CO_2CCH=CH$ | Br | 25 |
| 95 | PS | Same as above | $HOCH_2$ | $Cl$—⌬(Cl)—$CH_2$ | $H_3CO_2CCH=CH$ | Br | 10 |
| 96 | PP | $C_5H_{11}$ | $C_5H_{11}$ | $C_5H_{11}$ | $H_3CO_2CCH=CH$ | Br | 30 |
| 97 | (³) | $HOCH_2$ | $NCCH_2CH_2$ | $H_5C_2O_2CCCH_2$ / $CH_2$ | $CH_2=CH$ | Cl | 25 |
| 98 | PC | $H_3CO_2CCCH_2$ / $CH_2$ | $CH_3$ | $CH_3$ | $CH_3$ | Br | 20 |
| 98A | PS | $NCCH_2CH_2$ | $NCCH_2CH_2$ | $NCCH_2CH$ | $CH_3$ | I | 5 |
| 98B | PS | $Cl$—⌬(Cl)—$CH_2$ | $Cl$—⌬(Cl)—$CH_2$ | $Cl$—⌬(Cl)—$CH_2$ | $CH_3$ | Cl | 10 |
| 98C | (⁵) | ⌬ | ⌬ | ⌬ | $C_2H_5$ | I | 20 |

¹ Mixture of BD-AN (10-75%) U.S. Patent No. 2,439,202 and AN-STY (25-90%).
² MMA/ST/AN 71/19/10.
³ Nylon.
⁴ Mixture of BD/AN (10/75) and AN/STY U.S. Patent No. 2,439,202 (25/90).
⁵ Blend of PS-(90%) and BD-STY (75/25)-(10%).

EXAMPLE 99

To a suitable reaction vessel equipped with gas inlet and outlet, thermometer and stirrer are added 19.4 parts of methyl-2-(chloromethyl) acrylate in 40 parts of acetonitrile and 27 parts of tris(2-cyanoethyl) phosphine with stirring. A vigorous exotherm occurs and a solid precipitates. The reaction mixture is kept in a nitrogen atmosphere for two hours. At the end of this time the solid is removed by filtration, washed with acetonitrile and anhydrous ether and dried in vacuum. 34 parts of tris(2-cyanoethyl)-2-carbomethoxypropenyl-3-phosphonium chloride are recovered (73% yield). The chloride is a white solid having a melting point of 151–154° C. dec. he solid is water-soluble and insoluble in hot methyl methacrylate.

Analysis.—Calcd. for $C_{14}H_{19}ClN_3O_2P$ (percent): P, 9.45; Cl, 10.82. Found (percent): P, 9.54; Cl, 10.74.

Infrared analysis shows (mull in mineral oil) a carbonyl band at 1707 cm.$^{-1}$, a $H_2C=CH$ band at 1630 cm.$^{-1}$ and $C=O$ bands at 1225 and 1132 cm.$^{-1}$.

Following the procedure of Example 99, various other phosphines were reacted with other unsaturated halogenated compounds. The results are set forth in Table II, below.

TABLE II

| Ex. | Tertiary phosphine | Unsaturated halide | Temp., °C. | Time, hours | Solvent | Yield, percent | Product |
|---|---|---|---|---|---|---|---|
| 100 | 26 parts of triphenyl phosphine | 13 parts of methyl-2-(chloromethyl) acrylate. | 81 | 2.5 | Acetonitrile | 97 | Triphenyl-2-carbomethoxypropenyl-3-phosphonium chloride. |
| 101 | 27 parts of tributyl phosphine | 19 parts of methyl-2-(chloromethyl) acrylate. | 75 | 2 | do | 74 | Tributyl-2-carbomethoxypropenyl-3-phosphonium chloride. |
| 102 | 30 parts of dimethyloctyl phosphine. | 17 parts of 3-chloroacrylic acid. | 65 | 4 | do | 80 | (2-carboxyvinyl) dimethyloctyl phosphonium chloride. |
| 103 | 26 parts of divinylmethyl phosphine. | 16 parts of butyl-2-(chloromethyl) acrylate. | 50 | 4 | do | 76 | 2-carbobutoxy-propenyl-3-methyl-divinylphosphonium chloride. |
| 104 | 28 parts of triscyanomethyl phosphine. | 15 parts of 4-chloro-3-butenoic acid. | 75 | 2 | do | 82 | 3-carboxypropenyl-1-triscyanomethylphosphonium-chloride. |
| 105 | 17 parts of 3-hydroxy-octylidipropenyl-3-phosphine. | 8 parts of methyl-3-chlorocrylate. | 80 | 2.5 | do | 79 | 2-carbomethoxyvinyl-3-hydroxy octyl-dipropenyl-3-phosphonium chloride. |
| 106 | 10 parts of trinaphtyl phosphine | 6 parts of methyl 5-chloro-4-pentenoate. | 73 | 3.5 | do | 83 | 4-carbomethoxy-1-buten-1-yl-trinaphthyl phosphonium chloride. |
| 107 | 21 parts of benzyldiphenyl phospine. | 11 parts of 3-bromoacrylic acid. | 68 | 4 | do | 71 | Benzyl-2-carboxyvinyl-diphenyl phosphonium bromide. |
| 108 | 36 parts of tris(2,4-dichlorobenzyl) phosphine. | 20 parts of ethyl 3-bromoacrylate. | 77 | 2 | do | 73 | 2-carboethoxy-vinyl-tris(2,4-chlorobenzyl) phosphonium bromide. |
| 109 | 15 parts of bis(p-nitrophenethyl) methylphosphine. | 9 parts of ethyl 2-(bromoethyl) acrylate. | 80 | 1.5 | do | 87 | 2-carboethoxy-propenyl-3-methyl bis(p-nitrophenethyl) phosphonium bromide. |
| 110 | 26 parts of tris (dimethylaminoethyl) phosphine. | 15 parts of ethyl 2-(bromoethyl) acrylate. | 75 | 3 | do | 75 | 2-carboethoxy-3-tris(dimethylaminoethyl) phosphonium bromide. |
| 111 | 9 parts of tris(carbomethoxymethyl) phosphine. | 6 parts of methyl 4-bromo-4-pentenoate. | 73 | 3 | Butanol | 82 | 4-carbomethoxy-1-buten-1-yl-tris(carbomethoxymethyl) phosphonium bromide. |
| 112 | 5 parts of trivinyl phosphine | 3 parts of 2-chloroacrylic acid. | 78 | 2.5 | Acetonitrile [1] | 91 | 1-carboxyvinyl-trivinyl phosphonium chloride. |
| 113 | 42 parts of bis(2-carboxyethyl) phenylphosphine. | 20 parts of 4-chloro-3-butenoic acid. | 65 | 4 | do | 88 | Bis(2-carboxyethyl)-3-carboxypropenyl-1-phenyl-phosphonium chloride. |
| 114 | 17 parts of dimethyl (p-vinylbenzyl) phosphine. | 8 parts of propyl-3-bromoacrylate. | 50 | 4 | do | 93 | 2-carbopropoxy-vinyl-dimethyl-p-vinylbenzyl phosphonium bromide. |
| 115 | 19 parts of tris(p-bromobenzyl) phosphine. | 10 parts of ethyl-2-(2-chloroethyl) acrylate. | 60 | 4 | do | 71 | 2-carboethoxy-1-buten-4-yl-tris (p-bromobenzyl) phosphonium chloride. |
| 116 | 10 parts of tris (2-dimethylaminobutyl) phosphine. | 10 parts of ethyl 5-bromo-4-pentenoate. | 60 | 4 | do | 52 | 4-carboethoxy-1-buten-1-yl-tris (2-dimethylaminobutyl) phosphonium bromide. |
| 117 | 14 parts of tris (1-carboethoxypropyl) phosphine. | 8 parts of 3-chloroacrylic acid. | 75 | 3 | do | 80 | Tris(1-carboethoxypropyl)-2-carboxyvinyl phosphonium chloride. |

[1] 0.1 parts hydroquinone added to retard polymerization.

What is claimed is:
1. A flame-retardant composition consisting essentially of a thermoplastic polymer selected from the group consisting of styrene polymers containing a majority of a styrene monomer, polymer of an α-olefin, polyamides having recurring amide groups as integral parts of the main polymer chain, polymers of methyl methacrylate containing a majority of methyl methacrylate, acrylonitrile-butadiene-styrene polymers containing a minority of styrene and styrene polymer-butadiene polymer blends and a flame-retarding amount of a monophosphonium halide having the formula

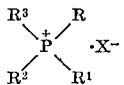

wherein R, $R^1$, $R^2$ and $R^3$ are individually selected from the group consisting of alkyl ($C_1$–$C_8$), alkenyl ($C_2$–$C_8$), cyano, hydroxy, imidazolyl, and carboxy substituted alkyl, ($C_1$–$C_8$), aryl ($C_6$–$C_{10}$), aralkyl ($C_7$–$C_{11}$), vinyl, halo, polyhalo, and nitro ar-substituted aralkyl ($C_7$–$C_{11}$), dialkylaminoalkyl ($C_3$–$C_6$), carboalkoxyalkyl ($C_3$–$C_6$), carboxyalkenyl ($C_3$–$C_9$) and carboalkoxyalkenyl ($C_3$–$C_6$) radicals, and X is selected from the group consisting of a bromine, chlorine, and iodine radical.

2. A flame-retardant composition according to claim 1 wherein the thermoplastic polymer is a polymer of an α-olefin.

3. A flame-retardant composition comprising polyethylene and a flame-retarding amount of methyltriphenylphosphonium iodide.

4. A flame-retardant composition comprising polyethylene and a flame-retarding amount of tris(2-cyanoethyl)-methylphosphonium iodide.

5. A flame-retardant composition comprising polyethylene and a flame-retarding amount of dichlorobenzyl-tris(2-cyanoethyl)phosphonium chloride.

6. A flame-retardant composition comprising polystyrene and a flame-retarding amount of tris(2-cyanoethyl)-methylphosphonium iodide.

7. A flame-retardant composition according to claim 1 wherein the thermoplastic polymer is poly(methyl methacrylate).

8. A flame-retardant composition comprising poly(methyl methacrylate) and a flame-retarding amount of methyltriphenylphosphonium iodide.

9. A flame-retardant composition comprising poly(methyl methacrylate) and a flame-retarding amount of tris(2-cyanoethyl)methylphosphonium iodide.

10. A flame-retardant composition comprising poly(methyl methacrylate) and a flame-retarding amount of dichlorobenzyl-tris(2-cyanoethyl)phosphonium chloride.

11. A flame-retardant composition comprising polystyrene and a flame-retarding amount of dichlorobenzyl-tris(2-cyanoethyl)phosphonium chloride.

12. A composition comprising a poly(hexamethylene adipamide) polymer and a phosphonium halide selected from the group consisting of methyl triphenyl phosphonium chloride, methyl triphenyl phosphonium bromide, methyl triphenyl phosphonium iodide, benzyl triphenyl phosphonium chloride, benzyl triphenyl phosphonium bromide and benzyl triphenyl phosphonium iodide, said phosphonium halide being present in an amount of up to five percent by weight based upon the weight of said polymer.

References Cited

UNITED STATES PATENTS

| | | | |
|---|---|---|---|
| 2,837,446 | 6/1958 | Cohen et al. | 117—139.5 X |
| 3,054,698 | 9/1962 | Wagner. | |

FOREIGN PATENTS

| | | |
|---|---|---|
| 885,200 | 4/1958 | Great Britain. |
| 1,101,351 | 3/1961 | Germany. |

OTHER REFERENCES

Rokey, K. W., Plastics (London), 26, No. 283, 103–106 (1961).

HOSEA E. TAYLOR, Primary Examiner

R. A. WHITE, Assistant Examiner

U.S. Cl. X.R.

106—15; 252—8.1; 260—45.7, 45.85, 45.9

UNITED STATES PATENT OFFICE
CERTIFICATE OF CORRECTION

Patent No. 3,530,164      Dated September 22, 1970

Inventor(s) Helen Currier Gillham; Allan Ellis Sherr; Harvey Gerald Klein

It is certified that error appears in the above-identified patent and that said Letters Patent are hereby corrected as shown below:

Column 2, line 21, insert, as a new paragraph, -- The thermoplastic polymers into which the flame-retardant agents may be incorporated to produce the novel compositions of the present invention, are generally the vinyl type polymers wherein the monomeric material is polymerized, by any known method, via the vinyl unsaturation therein. --. Column 3, line 56, insert, as a new paragraph, -- As mentioned above, we have discovered the addition of monophosphonium halides to a thermoplastic resin results in the production of resinous compositions having excellent flame-retardant properties. According to the present invention, any monophosphonium halide, stable to processing conditions may be used for this purpose. --; Column 3, line 67, insert as the first sentence of the last paragraph, -- These monophosphonium halides can be incorporated into the resin by any know method. --. Column 5, line 17, "ocetnylphosphonium" should read -- octenylphosphonium --; Column 5, line 35, "tetrahydroxymethyphosphonium" should read -- tetrahydroxymethylphosphonium --; Column 5, line 51, "tetracarboxylmethylphosphonium" should read -- tetracarboxymethylphosphonium --. Column 6, line 19, "tetrabenylphosphonium" should read -- tetrabenzylphosphonium --; Column 6, line 45, "diode" should read -- iodide --. Column 9, line 11,

UNITED STATES PATENT OFFICE
CERTIFICATE OF CORRECTION

PAGE - 2

Patent No. 3,530,164    Dated September 22, 1970

Inventor(s) Helen Currier Gillham; Allan Ellis Sherr; Harvey Gerald Klein

It is certified that error appears in the above-identified patent and that said Letters Patent are hereby corrected as shown below:

"tributy" should read -- tributyl --; Column 9, line 43, insert as a new paragraph, -- It is also within the scope of the present invention to incorporate such ingredients as plasticizers, dyes, pigments, stabilizers, antioxidants, antistatic agents and the like to out novel compositions. -- . Column 10, line 36, "ffame" should read -- flame --. Columns 9 and 10, Example 18, Table I, under the heading R', "NCCH$_2$CH$_2$" should read -- NCCH$_2$CH$_2$ --. Columns 11 and 12, Example 24, Table I, under the heading R', "NCCH$_2$CH$_2$" should read -- NCCH$_2$CH$_2$ --; Columns 11 and 12, Example 33, Table I, under the heading R, "CH$_3$CHCH" should read -- CH$_3$CHCH$_2$ --; Columns 11 and 12, Example
         |                              |
         OH                             OH
34, Table I, under the heading R, "CH$_3$CHCH" should read
                                       |
                                       OH -- CH$_3$CHCH$_2$ -- . Column 17, line 73, "he" should read -- The --.
      |
      OH
Columns 17 and 18, Example 107, Table II, "phospine" should read -- phosphine -- .

Signed and sealed this 28th day of December 1971.

(SEAL)
Attest:

EDWARD M. FLETCHER, JR.
Attesting Officer

ROBERT GOTTSCHALK
Acting Commissioner of Patents